(12) United States Patent
Kroswek et al.

(10) Patent No.: US 7,711,602 B2
(45) Date of Patent: May 4, 2010

(54) SYSTEMS AND METHODS FOR SUPPLY CHAIN MANAGEMENT

(75) Inventors: Thomas R. Kroswek, Novi, MI (US); Anthony D. Han, South Lyon, MI (US); James W. Moore, Barrington, IL (US)

(73) Assignee: Ryder Integrated Logistics, Miami, FL (US)

( * ) Notice: Subject to any disclaimer, the term of this patent is extended or adjusted under 35 U.S.C. 154(b) by 1747 days.

(21) Appl. No.: 10/669,277

(22) Filed: Sep. 23, 2003

(65) Prior Publication Data

US 2005/0065828 A1 Mar. 24, 2005

(51) Int. Cl.
*G06G 1/14* (2006.01)
(52) U.S. Cl. .................. 705/22; 705/7; 705/8; 705/10; 705/26; 705/28; 705/30; 717/174; 717/178
(58) Field of Classification Search .................. 705/22
See application file for complete search history.

(56) References Cited

U.S. PATENT DOCUMENTS

2002/0188513 A1* 12/2002 Gil et al. ..................... 705/22
2003/0050819 A1* 3/2003 Koenigbauer et al. .......... 705/8
2005/0209732 A1* 9/2005 Audimoolam et al. ........ 700/216

OTHER PUBLICATIONS

Reyes, Pedro, Raisinghani, Mahesh S, & Singh, Manoj. Global supply chain management in the telecommunications industry: The role of information technology in integration of supply chain entities. Journal of Global Information Technology Management. 2002. v5n2, pp. 48-67.*

* cited by examiner

*Primary Examiner*—F. Zeender
*Assistant Examiner*—Fawaad Haider
(74) *Attorney, Agent, or Firm*—Jones Day

(57) ABSTRACT

The present invention is directed to systems and methods for supply chain management. An order for one or more products is received from a buyer or a seller. For each product in the received order, a buyer and a seller are determined. In some instances, multiple buyers and/or sellers may be determined. A product shipment configuration and a logistics plan are generated. A transporter is determined. The generated product shipment configuration is transmitted to a buyer, a seller, a transporter or combinations thereof. The generated logistics plan is transmitted to a buyer, a seller, a transporter or combinations thereof. In some embodiments, event data related to the generated logistics plan is received. In some such embodiment, exception reports are generated from the received event data. These processes, or subsets thereof, can in certain instances be implemented on a system processor in communication with a system data store, or be stored in the form of executable instructions on one or more computer readable media.

1 Claim, 8 Drawing Sheets

SYSTEMS AND METHODS FOR SUPPLY CHAIN MANAGEMENT

BACKGROUND

The present invention is directed to systems and methods for supply chain management. More specifically, without limitation, the present invention relates to enhanced integration and management of logistics for supply chains.

The current logistics process is a tower of Babel. The process of procuring, replenishing, transporting and storing a part or product involves hundreds of disparate, discontinuous and disconnected information systems.

For example, a large manufacturer may broadcast its plan raw material requirements and work-in-process requirements using EDI (Electronic Data Interchange) formats such as the TDCC 830 format (Transportation Data Coordinating Committee). This format will provide material forecast, but this format does not authorize the release of material. Yet another format, the 862 EDI, authorizes the release of a specified quantity of a part and dictates the arrival date of the part quantity. In general this arrival date is a "must arrive by" rather than "must arrive on this unique date".

Following this, a supplier must develop an internal process and information system to parse the 862 into a package quantity, then into a ship quantity, then into a shipment containerization. Currently a part release is not subdivided into an optimum frequency. Rather, the entire release quantity is assume to be shipped at one time, to arrive on or before the scheduled date.

The next step in this process is the selection of a transportation mode-LTL (Less Than Truckload), TL (Truckload), Parcel, TOFC (Trailer-On-Flatcar)-followed then by the selection of a specific carrier within that modal selection. This process also is produced by discrete, unique information systems that are not integrated back to the material release itself.

Following the selection of the mode and carrier, the tender of the part shipment is now required. This is a specific communication to a carrier that outlines the shipment, its attributes, time of pick-up and its expected arrival date, (and often specific time appointment). To this point, the buyer's purchase order is the controlling document. At the point of shipment, six new documents are created that are interrelated but historically have been disconnected. These are: Bill of Lading (BOL), Shipping Order (SO), Freight Bill (FB), Manifest, Receipt and Packing List.

Once a shipment is tendered, its progress is managed by a carrier's information system. No two carriers use the same IT system. Furthermore, these information systems do not generally integrate with, or communicate to, the core manufacturing information system that generated the initial material release (e.g., 862). Nor do they While in progress a shipment requires its own information regarding price (freight bill and invoice), progress (Advance Ship Notice), quality, timeliness and vendor. These systems, too, are discrete.

Furthermore, a shipment can often change modes and carriers during its short life. A five day shipment from Mexico to Michigan, for example, can be handled by four or five different transportation companies en-route to its destination. Each of these firms will use unique information technologies that do not communicate with each other.

To further complicate the information management of a shipment, it is often the case that one or several of the participants in the chain of the shipment do not use electronic communication. Often there is no electronically automated method for information management-standard phone, fax or manual written communication is used.

For example, examine the inbound parts procurement and shipment process for the Automotive OEM (original equipment manufacturer) community-the largest manufacturing enterprises in the world. Despite being the most automated in the world, these processes are still replete with manual process. The first communication in this chain—the 862 EDI—is uniformly used to communicate to the Tier One supplier. However, the other participants in this chain of material movement often cannot accept an EDI file, use incompatible information systems, or have no means to communicate electronically and rely on manual information process such as telephone, fax and mail. The vast majority of transportation firms cannot process a manufacturer's 862 message—the total part quantity is not meaningful to them.

The result is a Tower of Babel—no easy, common communication language among the parties to a shipment. This discontinuity of information causes duplication of process among all participants in the chain of events that comprise a shipment. This discontinuity causes additional time in the chain of events, additional uncertainty regarding arrival, quantity and quality of a shipment. The additional time and uncertainty then require additional excess inventory to support the material flow. This Babel exists despite a common requirement for basic information: How much should be shipped? How much was shipped? Who has possession of the shipment now? Where is the shipment now?

The systems and methods according to the present invention provide solutions to these and other management issues associated with supply chain logistics. Specifically, the present invention provides a common, web-enabled communication utility that serves the entire community involved in a product shipment: buyer, transporter, logistics manager and seller.

SUMMARY

The present invention is directed to systems and methods for supply chain management. According to the present invention, a method of supply chain management includes a variety of steps as describe herein below. An order is received from a buyer or from a seller. The received order includes information regarding one or more ordered products. For each product in the received order, a buyer and a seller are determined. A product shipment configuration and a logistics plan are generated. A transporter is determined. The generated logistics plan is transmitted to a recipient. The generated product shipment configuration is transmitted to a recipient. The recipient in both cases is usually the buyer, the seller, the transporter or a supply chain management administrator.

The scope of the present invention is not limited to the order of steps or segregation of steps described above; rather, the aggregation of steps into single steps or reordering of such steps are specifically contemplated. In certain embodiments, the above described method may be executed, in whole or in part, by the environment summarized below. In addition, one or more of the described steps may be stored as computer executable instructions in and/or on any suitable combination of computer-readable media. Instead of, or in addition to stored instructions, one or more steps may be executed by special purpose hardware designed to perform such steps.

One preferred embodiment according to the present invention includes a system data store (SDS) and a system processor. The SDS stores data needed to provide the desired supply chain management functionality and may include, for example, product data, manifests, capacity data, schedule data, routing data, event data, exception reports, buyer data, seller data and transporter data. The SDS may include multiple physical and/or logical data stores for storing the various types of information. Data storage and retrieval functionality may be provided by either the system processor or data storage processors associated with, or included within, the SDS.

The system processor is in communication with the SDS via any suitable communication channel(s). The system processor may include one or more processing elements that provide and/or support the desired supply chain management functionality. In some embodiments, the system processor can include local, central and/or peer processing elements depending upon equipment and the configuration thereof.

Additional advantages of the invention will be set forth in part in the description which follows, and in part will be obvious from the description, or may be learned by practice of the invention. The advantages of the invention will be realized and attained by means of the elements and combinations particularly pointed out herein. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Figure 1:
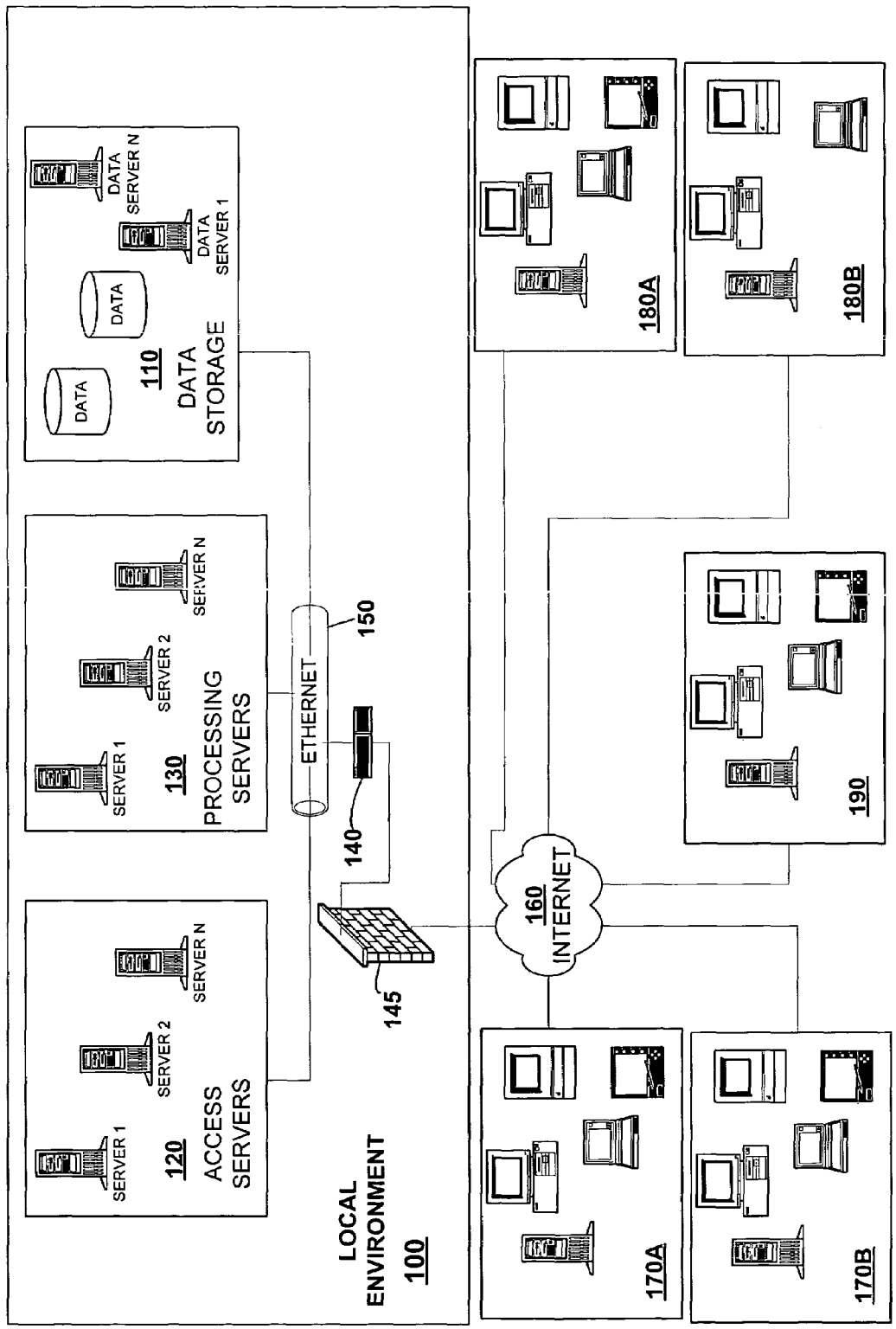
FIG. 1 graphically depicts an environment architecture framework that could be used to support one or more embodiments of the present invention, or portions thereof.

Exemplary embodiments of the present invention are now described in detail. Referring to the drawings, like numbers indicate like parts throughout the views. As used in the description herein, the meaning of "a," "an," and "the" includes plural reference unless the context clearly dictates otherwise. Also, as used in the description herein, the meaning of "in" includes "in" and "on" unless the context clearly dictates otherwise. Finally, as used in the description herein, the meanings of "and" and "or" include both the conjunctive and disjunctive and may be used interchangeably unless the context clearly dictates otherwise; the phrase "exclusive or" may be used to indicate situation where only a single choice among the provided alternatives may be selected.

Throughout the description below and the claims thereafter the following terms shall have the meanings provided unless the context clearly dictates otherwise.

Itinerary—Scheduled set of loads for a given route, composed of a single window time for each stop.

Load—A move of one or more shipments via a sequence of stops such that the move starts and ends with an empty truck. At each stop, shipments may be picked up or dropped off. Drop-offs must be in reverse order of pick-up. (Refers to: shipments, stops)

Location—A place possessing a physical address

Route—A continuous move composed of two of more loads (aka Trip in Tpt. Modeler).

Stop—A pick up and drop off location that is part of a load. (Refers to: shipments, location, and loads)

Schedule—A set of route itineraries

Shipment—A physical collection of packagings that moves between any two locations. (Refers to: locations, packages)

Trip—A running instance of a route

FIG. 1 depicts one logical architecture framework 100 for implementing various aspects of the present invention. The framework 100 includes various computers interconnected via an Ethernet 150. The Ethernet 150 in terms connects to the Internet 160 via router 140 and firewall 145. Various users of the environment such as sellers 170A, 170B, buyer 190 and transporters 180A, 180B can access the environment via the Internet 160; it will be readily appreciated by those skilled in the art that any number of sellers, buyers and/or transporters can access the environment and that the depiction of a limited number is purely for exemplary purposes.

The users typically access the environment through access servers 120 which can include any combination of suitable servers such as Web servers, e-mail servers, automated voice response systems, etc. The access servers 120 query the processing servers 130 to process and format data for return to the users via the access servers. The processing servers 130 in term retrieve data from data storage servers 110. The collective processing elements of the various servers form the system processor that supports the supply chain management functionality of the present invention. The data storage devices and servers form the system data store (SDS) that supports the storage of data required for providing the desired functionality of the present invention.

As depicted in FIG. 1, the access servers 120 and other resources of the framework 100 connected to Ethernet 150 can be connected behind firewall 145 that protects these resources from the unauthorized intrusion by users attempting to gain access to the framework 100 via the Internet 160. In one preferred embodiment, the access servers 120 can be connected between firewall 145 and a second firewall (not shown) to further insulate the remaining resources of the framework 100 from unauthorized access.

Figure 2:
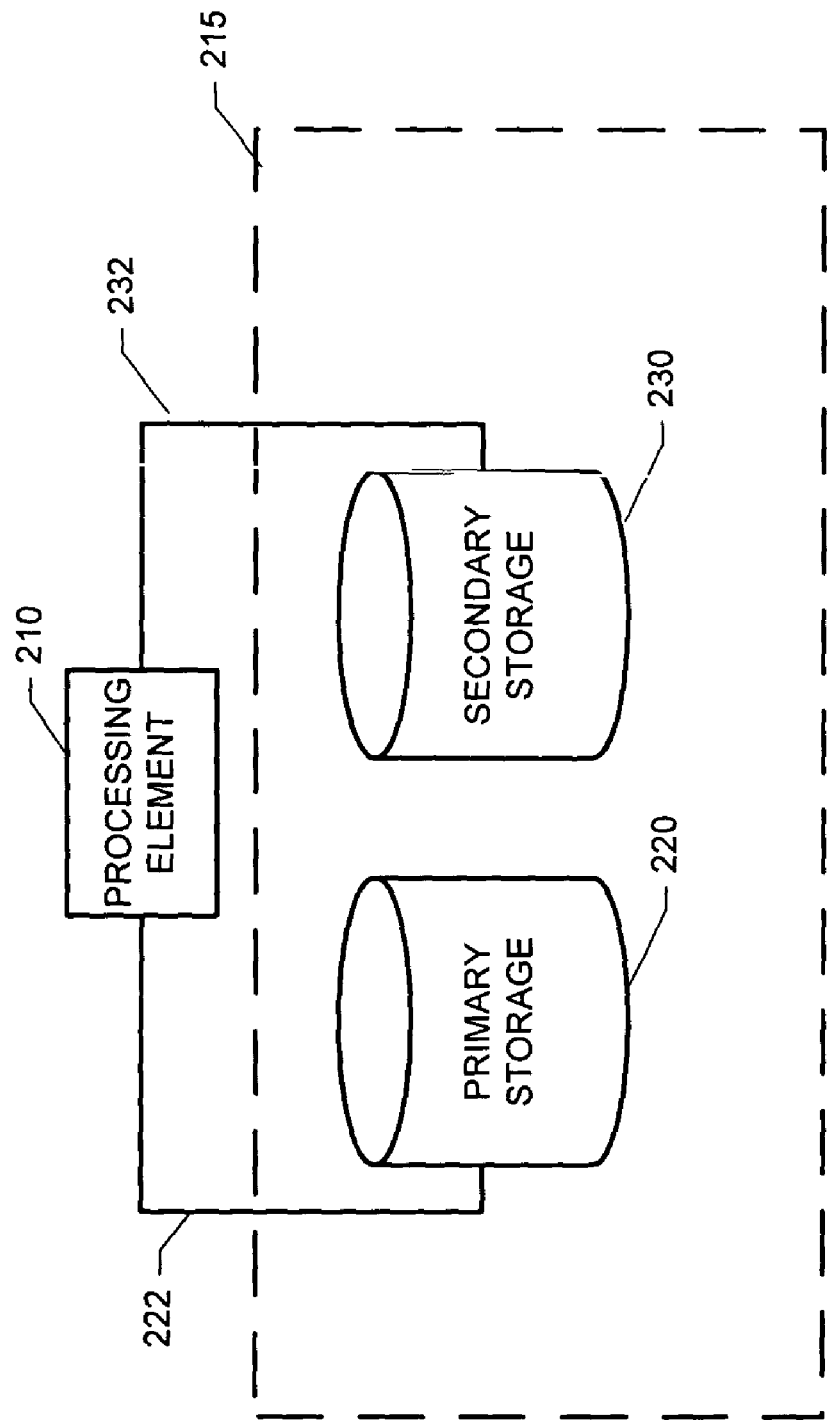
FIG. 2 is a diagram of a logical architecture for supporting various embodiments of the present invention.

The supply chain management methods of the present invention may be utilized in many different environments, such as the environment shown in FIG. 1. A general architecture is depicted in FIG. 2. The environment may include a system processor potentially including multiple processing elements (e.g., processing element 210). The term processing element may refer to (1) a process running on a particular piece, or across particular pieces, of hardware, (2) a particular piece of hardware, or either (1) or (2) as the context allows. Each processing element may be supported by one or more general purpose processors such as Intel-compatible processor platforms including PENTIUM IV or CELERON (Intel Corp., Santa Clara, Calif.), UltraSPARC (Sun Microsystems, Palo Alto, Calif.) and/or Athlon (Advanced Micro Devices, Sunnyvale, Calif.) and/or one or more ontimized local processors such as a digital signal processors (DSPs), application specific integrated circuits (ASICs) and/or field programmable gate arrays (FPGAs).

The depicted hardware components include an SDS 215 that could include a variety of primary 220 and secondary 230 storage elements. As an example, an SDS 215 could include RAM as part of the primary storage 220; the amount of RAM might typically range from 64 MB to 2 GB in each individual hardware device although these amounts could vary. The primary storage 220 may in some embodiments include other forms of memory such as cache memory, registers, non-volatile memory (e.g., FLASH, ROM, EPROM, etc.), etc. The primary storage 220 may communicate with the system processor, or particular elements thereof, in a standard manner or manners (pathway 222), including without limitation on chip communication path and/or serial and/or parallel bus pathways inter- and/or intra-board. SDS 215 may also include secondary storage 130 containing single, multiple and/or varied servers and storage elements. It should be understood that the different information used in the supply chain management processes and systems may be logically or physically segregated within a single device serving as secondary storage 230 for the SDS 215; multiple related data stores accessible through a unified management system, which together serve as the SDS 215; or multiple independent data stores individually accessible through disparate management systems, which may in some embodiments be collectively viewed as the SDS 215.

For example, SDS 215 may use internal storage devices connected to the system processor 210. In embodiments where a single processing element such as a PENTIUM IV general purpose processor is the system processor 210 and supports all of the supply chain management functionality, one or more local hard disk drives and/or one or more removable media drives may serve as the secondary storage of the SDS 215 communicating with the processing element via a suitable direct connection 232 such as an IDE, USB or SCSI bus connection or through a network connection to locally accessible network connected storage (not shown), and a disk operating system executing on such a single processing element may act as a data server receiving and servicing data requests.

The architecture of the secondary storage of the computer storage 215 may vary significantly in different environments. In several typical environments, database(s) can be used to store and manipulate the data such as resources and/or version metadata; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other embodiments, the data store may use database systems with other architectures such as object-oriented, spatial, object-relational, network or hierarchical.

Instead of, or in addition to, those organization approaches discussed above, certain embodiments may use other storage implementations such as hash tables or flat files or combinations of such architectures. Such alternative approaches may use data servers other than database management systems such as (1) a hash table look-up server, procedure and/or process and/or (2) a flat file retrieval server, procedure and/or process. Further, the computer storage 215 may use a combination of any of such approaches in organizing its secondary storage architecture.

The hardware components may each have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant). A typical environment includes a WINDOWS/XP (or other WINDOWS family) operating system. Client platforms accessing the supply chain management servers such as wireless devices and/or PDAs may use an appropriate operating system such as Windows/CE, PalmOS, or other suitable mobile phone or PDA operating system.

Depending upon the hardware/operating system platform of the overall environment, appropriate server software may be included to support the desired access for the purpose of configuration, monitoring and/or reporting. Web server functionality may be provided via an Internet Information Server (Microsoft, Redmond, Wash.), an Apache HTTP Server (Apache Software Foundation, Forest Hill, Md.), an iPlanet Web Server (iplanet E-Commerce Solutions—A Sun—Netscape Alliance, Mountain View, Calif.) or other suitable Web server platform. The e-mail services may be supported via an Exchange Server (Microsoft, Redmond, Wash.), LotusNotes, Groupwise, sendmail or other suitable e-mail server. Some embodiments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach.

In one aspect, the present invention synchronizes the logistics information regarding a product shipment with the material release information throughout the life of a product shipment from material release through receipt of the material specified in the release. It also provides a common communication utility to all parties in the chain. This communication utility is available by internet access to any party using commonly available web browsing software.

Systems and methods according to the present invention in various embodiments can process the raw information of the material release—e.g., number of products and time to deliver by—and produces a rich data product that provides, for example:

the number of packages required for a material release the number of shippable containers—packages, pallets, containers—for a material release the planned schedule for the sequence of events that comprise the life of a shipment an electronic link between the shipment and the original material release an electronic link between the shipment information and the shipper's Bill of Lading.

"real time" information as to who is in possession of the shipment at any point in the shipment life status of the shipment schedule versus the planned schedule of events for that shipment a method to automatically remedy variance of plan to actual for a shipment a method to incorporate unique business rules for managing variance from plan A logistics release is the capability to configure a specific product amount within a Bill of Material into an optimum shipment. This capability includes weight, cube, packaging, stackability, pallet configuration and mode determination. It further includes the planned schedule of events for a shipment and a process to measure plan progress to actual.

In one aspect, the present invention produces the synchronization of the manufacturing release with inventory requirements and a broad logistics network. In a further aspect, the present invention solves the logistics communication problem and provides a logistics plan for every included product.

In a further aspect, the present invention establishes the base logistics plan for the shipment events, and the event management capability monitors and intervenes appropriately as shipments vary from planned performance.

Subsequent to the logistic release, the shipments flow through a sequence of events that are managed using the alert system within an operational management system (JIT/EMS), which can be included in some embodiments of the present invention.

Accordingly, the present invention synchronizes the manufacturing release with the logistics network eliminating miscommunication between manufacturing, the supplier, the logistics provider and the carrier. Any participant in the shipment can link the product, the FB, the PO (purchase order), the SO, the BOL with the original material release. At the same time, all participants share the plan for the shipment and are simultaneously informed regarding changes to that plan.

Figure 3:
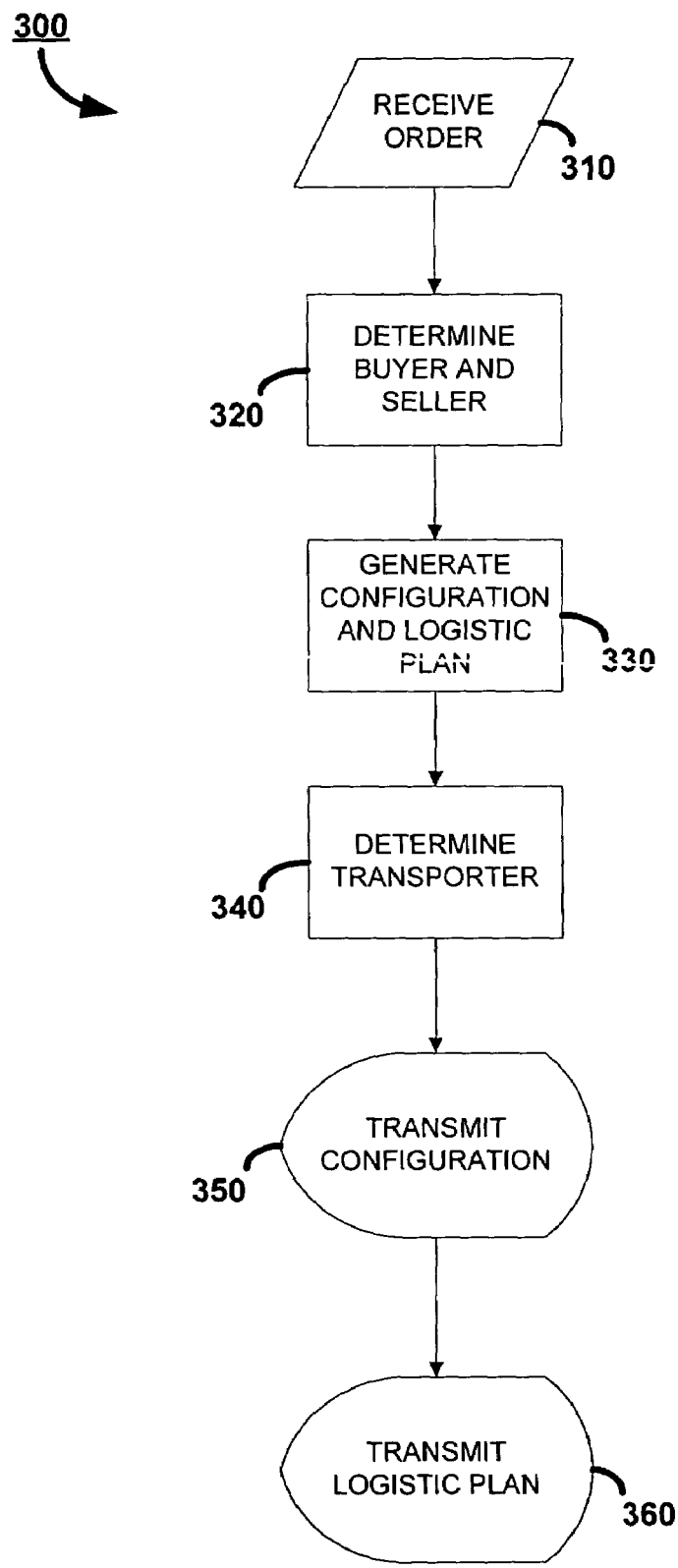
FIG. 3 is a flow chart depicting an exemplary process according to the present invention.

FIG. 3 is a flow chart depicting steps in an exemplary process 300 according to the present invention.

In step 310, an order for one or more products is received from a supply chain participant such as a buyer or a seller. If the order originates from a buyer, the order represents items to be purchased from one or more sellers. If the order originates with a buyer, the order represents items sold to one or more buyers. In some instances, the received order may originate with another participant in the supply chain. This may occur if neither buyer nor seller uses supply management according to the present invention, however, the participant does and wishes to receive the benefits of such use and/or provide the buyer and/or the seller with access to information regarding the processing of an order.

In some embodiments, the order is received via one or more access server; these access servers can include, without limitation, web servers, e-mail servers, ftp servers, interactive voice/tone response systems, and/or fax servers. In instance where the received order is in a format specific to the source of the order, the received order can be formatted according to a format independent from any format used by any supply chain participant and specific to the supply chain management administrator. The received order can, in some embodiments, be stored in a system data store. In such embodiments, steps 320 and 330 as further described below can involve accessing the system data store for the stored order, or portions thereof.

In step 320, a buyer and a seller are determined for each product in the received order. In some cases, multiple buyers and/or sellers can be determined. In some embodiments, determination of the buyer and the seller for each product involves accessing a system data store for data relevant to the determination such as product data and/or the received order.

The determination can occur in a variety of ways and depend upon a variety of criteria. In one embodiment, the buyer and/or seller can be determined through direct reference to the received order. For instance, the received order could directly include a specific reference to the buyer and/or seller. Alternatively, for a given product in the received order, only a single buyer may exist who uses the product, and/or only a single seller may make the product.

In some embodiments, the determination can include the steps of: (a) retrieving an entry for each product from a system data store, (b) identifying the buyer for each product from the received order, the retrieved entry or combinations thereof, and (c) identifying the seller for each product from the received order, the retrieved entry or combinations thereof. The identification of the seller in such embodiments, or the determination of the seller in other embodiments, can include selecting a seller based upon one or more criteria such as pricing constraints, volume constraints, distance constraints, time constraints, performance constraints, financial constraints, and/or combinations thereof. Such criteria could be used for selecting among a several potential sellers for a given product.

In step 330, a product shipment configuration and a logistics plan are generated. In some instances, multiple configurations and/or logistics plan can be generated. The product shipment configuration and logistics plan are generated based upon a variety of factors that can include, without limitation, the received order, the determined seller, the determined buyer and combinations thereof. In some embodiments, this step involves accessing a system data store for data relevant to the determination.

Figure 4:
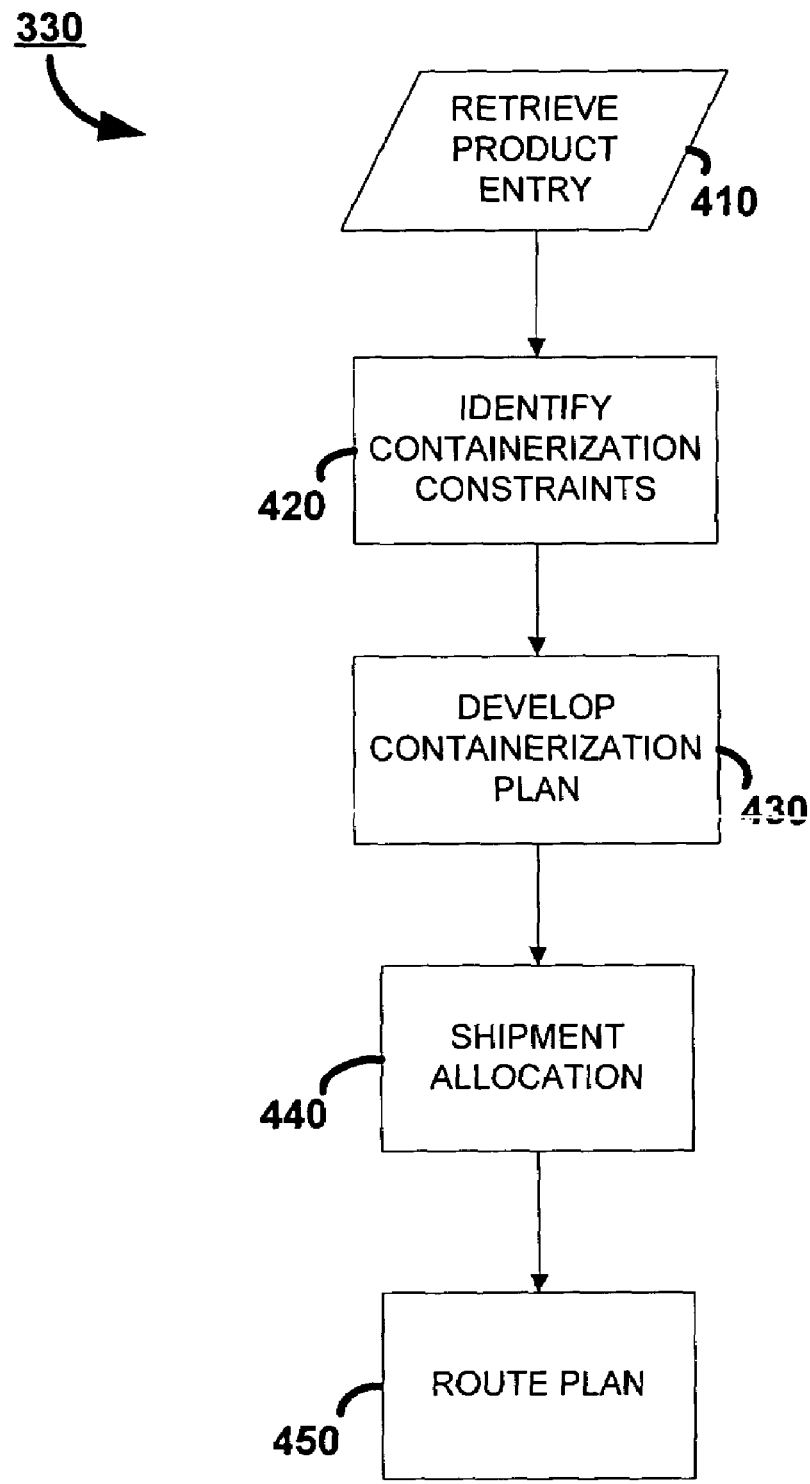
FIG. 4 is a flow chart depicting the steps in an exemplary process for product shipment configuration and logistics plan generation.

FIG. 4 is a flow chart depicting the steps in an exemplary process for generating a product shipment configuration and a logistics plan. In step 410, a product entry for each product in the order is retrieved from a system data store. The product entry at least contains containerization constraints for each such product. Alternatively, some embodiments can forego the entry retrieval step where containerization constraints are provided in the received order.

In step 420, containerization constraints for each product are identified. The containerization constraints can be determined from the entry retrieved in step 410. In alternative embodiments, the containerization constraints can be identified through direct reference to the received order. In yet other embodiments, containerization constraints could be retrieved via a query to the determined seller over a suitable communication channel; for example, the product information could be requested via a suitable web or ftp request to a site hosted by the determined seller.

In step 430, a containerization plan for each product is developed based upon its associated containerization constraints and the received order. The development of the plan can occur according to any of the approaches generally known to those skilled in the art.

In step 440, the received order is allocated into one or more shipments based upon the containerization plan. In some embodiments, the allocation of the order into shipments involves comparing the capacity requirements of the order as defined in the containerization plan with capacity information for a selected cargo space (e.g., particular trailer, cargo bay of plane or ship, boxcar, etc.). Some such embodiments include a cargo space selection process; such a process could base selection on a number of criteria including, without limitation, the received order, the containerization plan, cargo space availability, destination of a shipment, cost, cargo space capacity, origin of a shipment and/or combinations thereof.

In step 450, a route plan is developed to satisfy the one or more shipments. The developed route plan is based at least in part upon the allocation of the received order into shipments and the received order. Generally, the route planning can occur according to any of the approaches generally known to those skilled in the art. In some embodiments, the route plan development can include optimizing mode of shipment, cost of transport, speed of shipment and/or combinations thereof Returning to FIG. 3 at step 340, a transporter is determined. In some instances, multiple transporters can be determined. This determination can occur in a variety of ways and depend upon a variety of criteria. In some instances, the determination is limited to a select set of one or more transporters. This can occur, for instance, where the order is received from a particular transporter; in such an instance, the set from which to determine the transporter could be limited to the transporter providing the order. In other cases, the buyer or seller may have relationships with a predefined set of transporters, and the determination of transporter may therefore be limited to this predefined set, or possibly the intersection of the buyer's predefined set and the seller's predefined set.

In some embodiments, the determination of transporter can be based upon a variety of factors including, without limitation, the generated logistics plan, the determined buyer, the determined seller, the received order or combinations thereof. In some such embodiments, the received order could be required to dictate a particular transporter; in such embodiments, the transporter is directly determined by referencing the received order.

In some embodiments, determination of the transporter involves accessing a system data store for data relevant to the determination.

In step 350, a product shipment configuration is transmitted to one or more participants (e.g., buyer, seller, transporter, depot operator, etc.) in the supply chain, to one or more computer systems or to one or more supply chain management administrator. The delivery platform for the transmitted product shipment configuration can be any suitable platform providing the product shipment configuration in a format perceivable by the recipient such as e-mail, web, ftp, fax, courier service, postal mail, pager, telephone and/or combinations thereof. In some embodiments, the product shipment configuration can include a three-dimensional model of a selected cargo with the configured shipment rendered therein.

This transmission can occur automatically, as the result of a trigger event and/or as a result of the receipt of a product shipment configuration request from a participant depending upon the mechanism(s) supported in a particular embodiment. In embodiments supporting the receipt of a request, such a request can be received by any suitable access server. In some such embodiments, the recipient of the product shipment configuration can be determined from the request (e.g., requester, other recipient indicated by an identifier in the request, etc.).

A notification of the readiness of a generated product shipment configuration can be sent to one or more supply chain participants. In some such embodiments, the notification can include a link that upon activation generates a product shipment configuration request.

In step 360, a logistics plan is transmitted to one or more in the supply chain (e.g., buyer, seller, transporter, warehouse operator, freight yard, etc.), to one or more computer systems or to one or more supply chain management administrator. The delivery platform for the transmitted product shipment configuration can be any suitable platform providing the product shipment configuration in a format perceivable by the recipient such as e-mail, web, ftp, fax, courier service, postal mail, pager, telephone and/or combinations thereof.

This transmission can occur automatically, as the result of a trigger event and/or as a result of the receipt of a logistics plan request from a participant depending upon the mechanism(s) supported in a particular embodiment. In embodiments supporting the receipt of a request, such a request can be received by any suitable access server. In some such embodiments, the recipient of the logistics plan can be determined from the request (e.g., requester, other recipient indicated by an identifier in the request, etc.).

A notification of the readiness of a generated logistics plan can be sent to one or more supply chain participants. In some such embodiments, the notification can include a link that upon activation generates a logistics plan request.

In some embodiments, product data can be received from one or more product sellers. This received product data is stored in a system data store. The received product data can include information such as price, capacity, containerization constraints or other data relevant to the product. Containerization constraints can include product height, weight, volume, packaging, stackability and/or other data defining product characteristics relevant to developing containerizaiton plans with respect to the product. In some such embodiments, the received data is formatted in accordance with a format specified by the supply chain management administrator that is independent from any format used by any supply chain participant. The product data can be received in some embodiments via one or more access servers; these access servers can include, without limitation, web servers, e-mail servers, ftp servers, interactive voice/tone response systems, and/or fax servers.

Further, the above process has been described with respect to a single received order. As is apparent to those skilled in the art, the above described process can occur in parallel and/or in series to handle multiple orders received from any number of buyers, sellers, transporters or other supply chain participants. In such cases, multiple orders previously and/or concurrently processed orders can impact the generation of product shipment configuration(s) and/or logistics plan(s) with respect to an order being processed.

In some embodiments, event data associated with a logistics plan can be received. The event data can represent any desired occurrence or circumstance associated with the logistics plan. The event data can be generated manually (e.g., manual entry of receipt of shipment at depot, phone call from driver indicating delay due to construction, etc.) or automatically (e.g., sensor on truck determining flat tire and wirelessly signaling same, etc.). The event data can originate from any suitable source including, without limitation, a supply chain participant, a supply chain management administrator, a governmental authority (e.g., police report, weight station, etc.) and/or combinations thereof. In some embodiments, an access server can be used to received submitted event data.

The receipt of event data can trigger transmission of notifications to one or more recipients in certain embodiments. The recipient can be a user or a computer system. The recipient for the notification can be predetermined or selected; selection of the recipient can be based upon a number of factors including, without limitation, the received event data, the logistics plan and/or combinations thereof. In some embodiments, the notification can include identification information associated with the received event data. In some such embodiments, the identification information can include a link that upon activation by the recipient provides access to the received event data.

In some embodiments, one or more exception reports can be generated based upon the received event data and the generated logistics plan. In certain, embodiments a notification of the generation of exception reports can be transmitted to one or more recipients. In some such embodiments, the notification can include identification information associated with each member of a subset of the generated exception reports; the subset includes at least one, but potentially all, of the generated exception reports. Some of these embodiments can further include in the identification information a link that upon activation by the recipient provides access to the associated exception report. In some embodiment the subset of exception reports included within a notification can be selected based upon a variety of factors including, without limitation, priority of the exception report, recipient of the notification, configuration information associated with the logistics plan and/or combinations thereof. As with notifications of event data, the recipient of the notification can be any suitable user or computer system. The notification can be delivered via any suitable delivery platform including without limitation, e-mail, web, ftp, fax, courier service, postal mail, telephone, pager and/or combinations thereof.

Instead of, or in addition to, the notification of generated exception reports, one or more generated exception reports can be outputted to any suitable recipient such as a user or a computer system. Any suitable delivery platform can be used for delivering the generated exception report such as e-mail, web, ftp, fax, courier service, postal mail, telephone, pager and/or combinations thereof. In some embodiments, the delivery platform is determined based upon the intended recipient. The user recipient of the exception report will typically be a supply chain participant or a supply chain management recipient; however, nothing precludes delivery to an interest user who is not a member of these communities of users. The computer recipient of the exception report will typically be an analytical system such as an evaluation systems that evaluates buyers, sellers and/or transporters, notification generation systems, etc. In some embodiments, an exception report is selected for output; in some such embodiment, the selection is based upon a priority associated with each exception report, the identity of intended recipient and/or combinations thereof. In certain embodiments, output of the generated exception report can result from the receipt of an exception report request. Such a request could, in some of these embodiments, be received via any suitable access server. For instance, a notification of the exception report including a link to the exception report could be triggered by a user thereby generating a request to a Web server that provides an HTML formatted version of the generated report.

Figure 5:
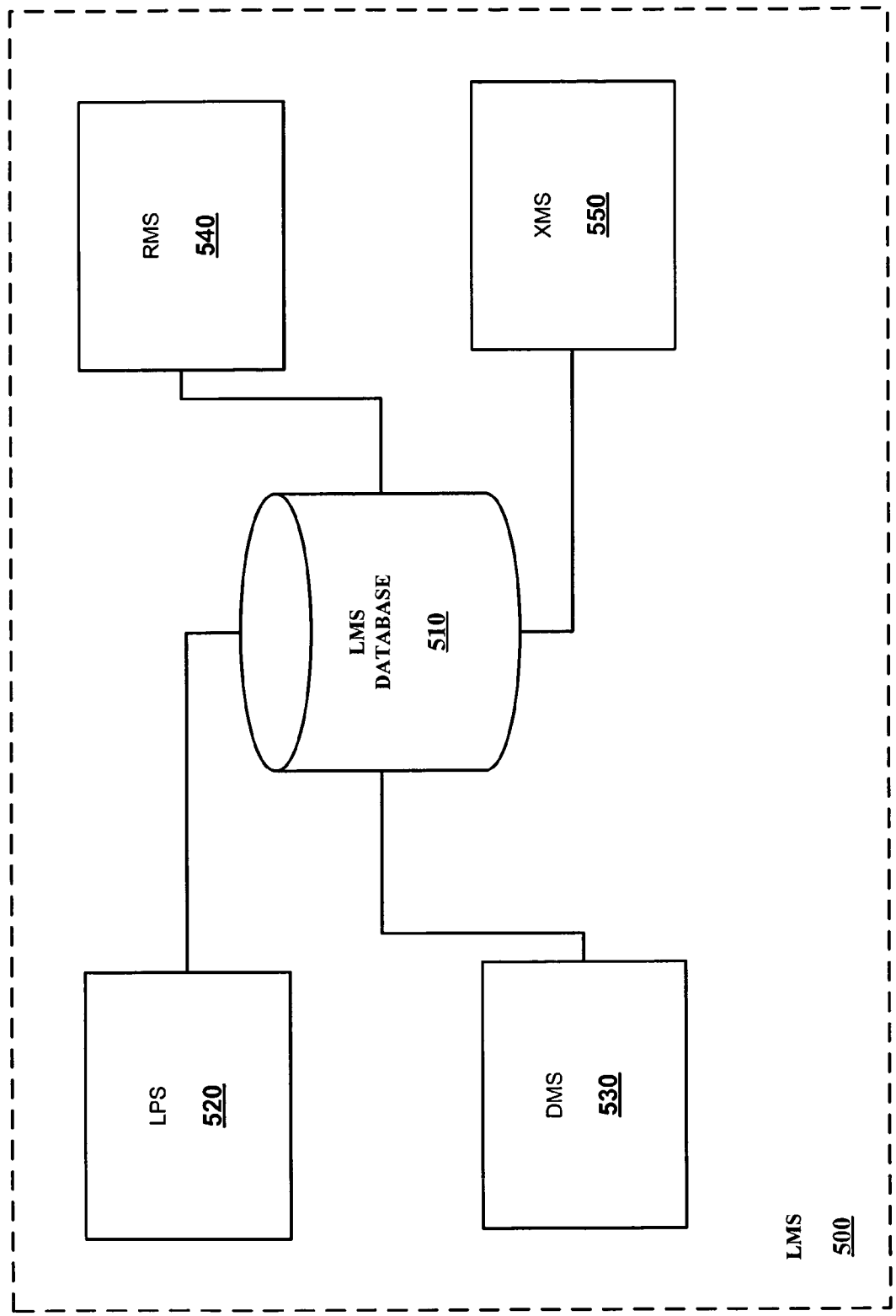
FIG. 5 is a diagram showing potential software modules in an exemplary logistics management suite according to the present invention.

The various steps, or subsets thereof, can be implemented through one or more software modules. FIG. 5 provides a block diagram for software modules in one preferred embodiment. A logitics management suite (LMS) 500 includes software modules: logistics planning system (LPS) 520, data management system (DMS) 530, release management system (RMS) 540 and execution management system (XMS) 550. These software modules connect to an LMS database 510. The supply chain management functionality can be distributed among these software modules that in some embodiments execute on the system processor and system data stores discussed above. The foregoing discussion provides an exemplary allocation of a variety of functionality among these software modules; it will be understood that different embodiments can employ other allocations. Further, other embodiments could employ alternative software modules for providing the desired functionality.

In one preferred embodiment, the LPS 520 performs various tasks associated with logistics planning. Such tasks include: (1) maintaining location information, (2) maintaining part and packaging information, (3) maintaining release information such as EDI 830 and/or 862, (4) creating, editing, updating, and/or deleting load plans (in many cases based on EDI 830), and (5) creating load plans via an interface with an optimizer such as the i2 Modeler. Different embodiments can support varying combinations of one or more of these tasks.

Figure 6:
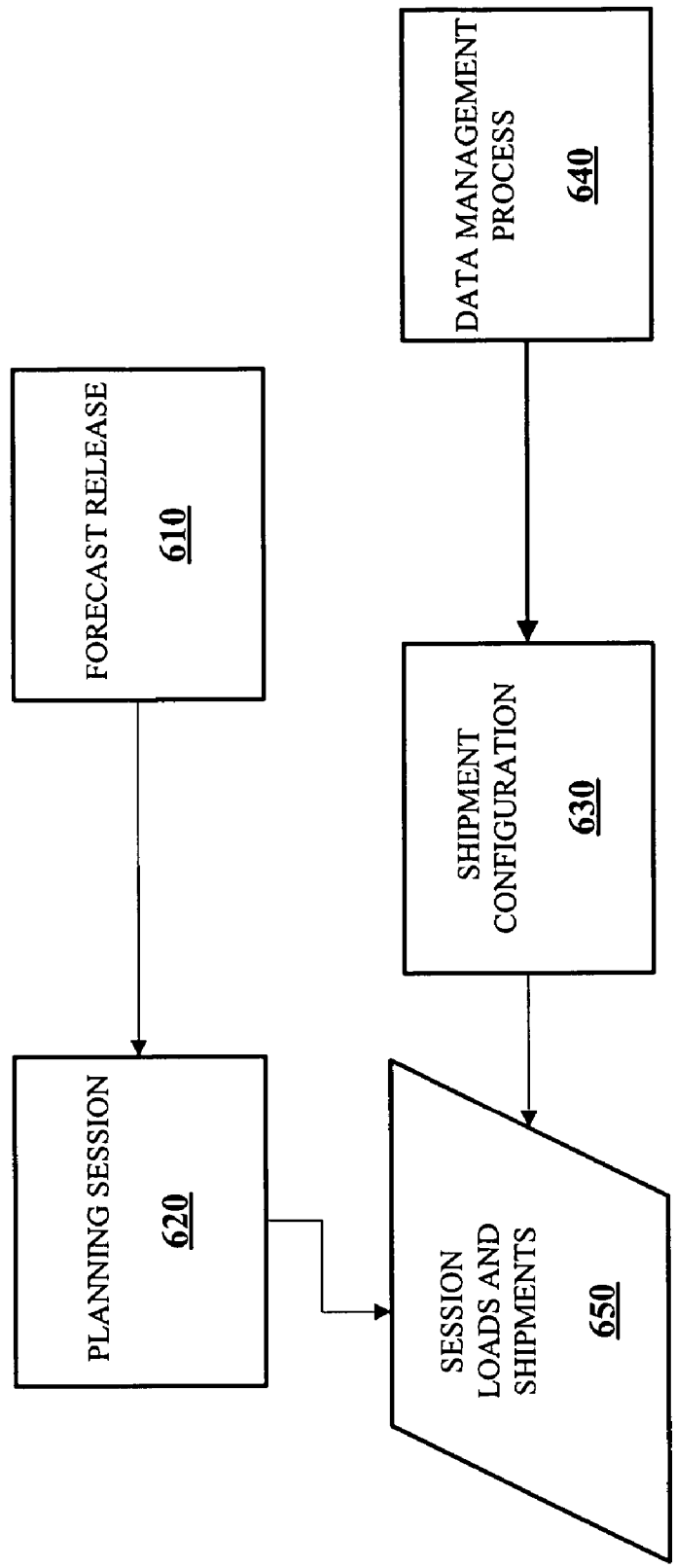
FIG. 6 is a flow chart depicting data flow in the logistics planning and data management systems.

FIG. 6 is a flow chart of data flow through the LPS 520 and DMS 530 modules. The release forecast 610 receives a raw release forecast as input. This raw release forecast can be imported into the LPS from an external source or from an internal source such as the LMS database. The output of this process is the release forecast. The release forecast is fed into the planning session process 620 that creates, updates, revises and/or deletes planning session loads and/or shipments. The output of this process is combined with shipment product container to generate the session loads and shipments 650. The shipment product containerization is generated through the shipment configuration process 630. The shipment configuration process in turn relies on product data (containerization constraints) supplied by the data management process 640. This process 640 retrieves this information from an external source such as a product manufacturer or from an internal source such as the LMS database 550. In certain embodiments, this process 640 is responsible for caputre and validation of containerization information for products. The session loads and shipments 650 are fed as input into the RMS 540.

In one preferred embodiment, the RMS 540 of FIG. 5 performs various tasks associated with release management. Such tasks can include: (1) generating loads (trips) based on LPS load plans (route plans), (2) matching EDI 862 to the generated loads (trips), (3) creating, editing, updating, and/or deleting loads and shipments, (4) dynamically creating loads from shipments, in some cases using an optimizer such as i2 Modeler, and/or (5) combining load and shipment information with EDI information for logistics release visibility. Different embodiments can support varying combinations of one or more of these tasks.

Figure 7:
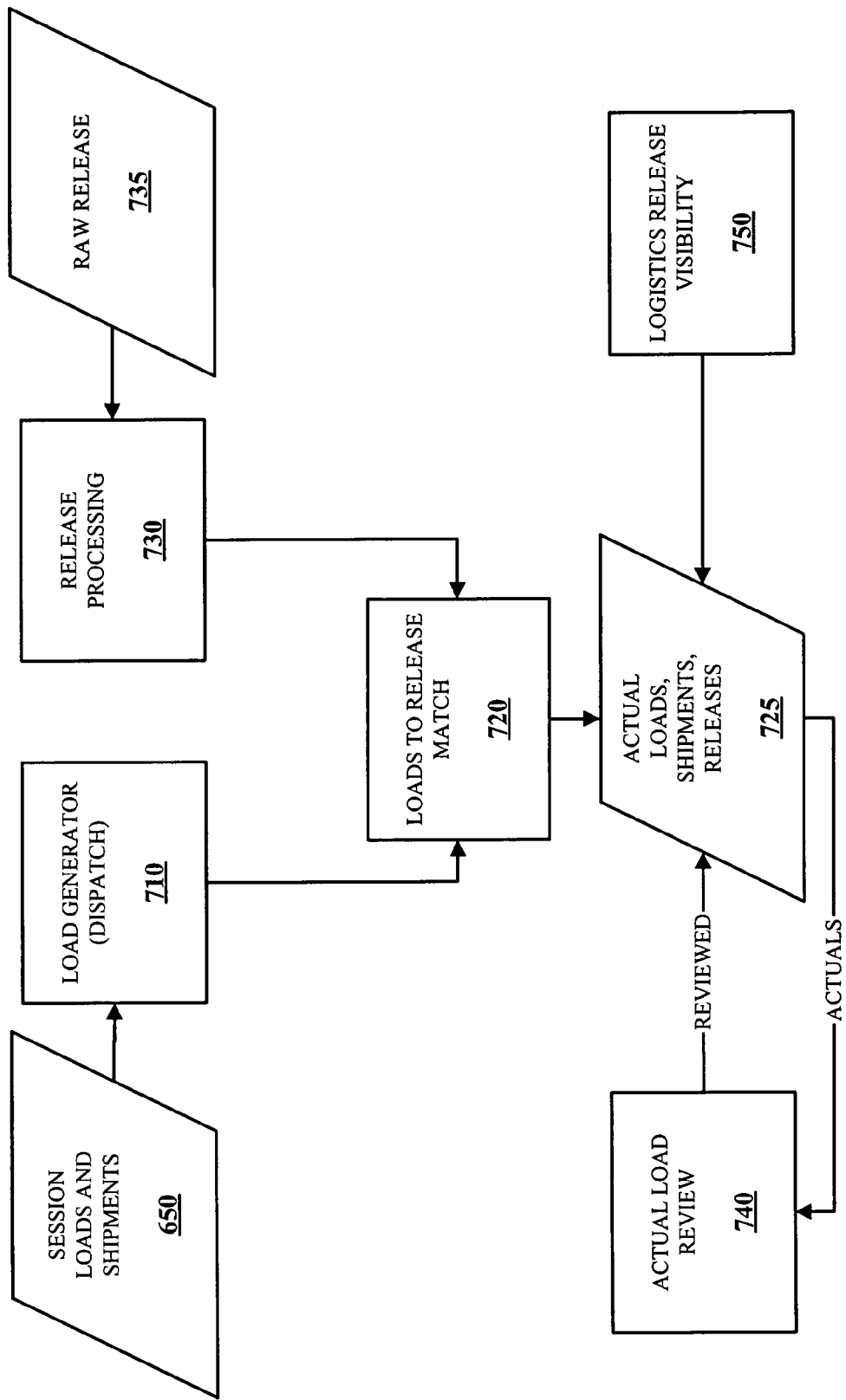
FIG. 7 is a flow chart depicting data flow in the release management system.

FIG. 7 is a flow chart of data flow through the RMS 540 module. Session loads and shipments from the LPS and DMS are fed into the load generator (dispatch) 710. This process 710 scans loads and shipments and generates loads and shipments for a specified date in the future. The output dispatched loads from this process 710 are fed into the loads to release matching process 720. This process 720 matches releases with proposed loads and shipments; it assigns products and their quantities to each shipment. It receives release information from release processing 730 that transforms raw release information 735 into a form usable in the matching process 720. The results of the matching process are fed into the proposed load review process 760. This process creates, updates, revises and/or deletes loads and shipments in order to satisfy releases. The process can in certain embodiments include sending proposed shipments to an optimization engine and importing the resultant load plans. The status of the loads and shipments that satisfy the releases are changed from proposed to actual, resulting in the actual loads, shipments and/or releases 725. These actual loads, shipments and releases are then optionally subject to review 740. The actual logistics release information is made available 750 to participants in the supply chain or other interested users such as via a Web site. The actual loads, shipments and/or releases 725 are made available to the XMS for further use.

In one preferred embodiment, the XMS 550 of FIG. 5 performs various tasks associated with release management. Such tasks can include: (1) activating loads and turning them into trips, (2) creating, editing, updating, and/or deleting trips and shipments, (3) monitoring active trips, (4) capturing trip and shipment events, (5) generating reports and other required documents (e.g., BOL, product manifest, etc.), (6) maintaining transporter information such as driver information, tractor information, cargo space information, etc., (7) tendering shipments and/or (8) exception management and/or reporting. Different embodiments can support varying combinations of one or more of these tasks.

Figure 8:
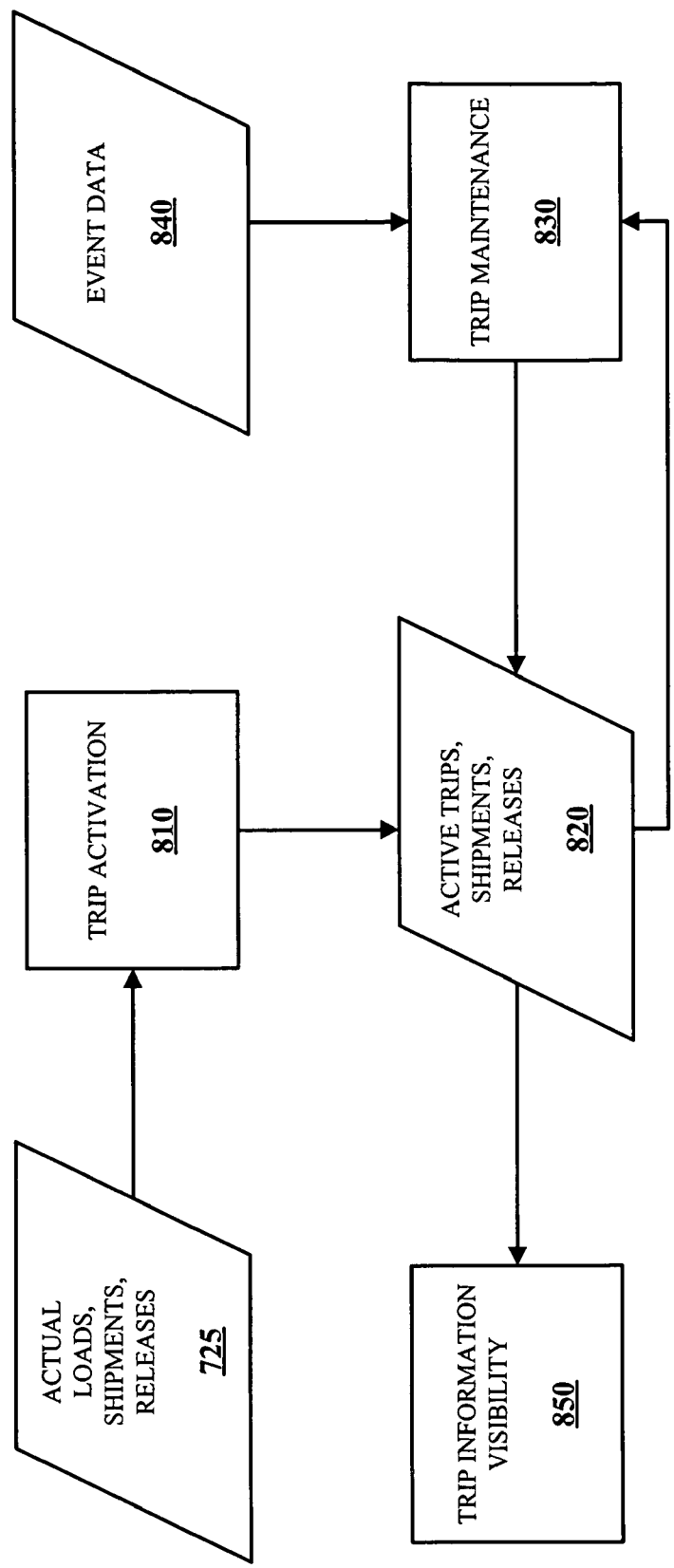
FIG. 8 is a flow chart depicting data flow in the execution management system.

FIG. 8 is a flow chart of data flow through the XMS 550 module. Actual loads, hinments and/or releases 725 are provided from the RMS 540. The trip activation process 810 takes this information and generates active trips, shipments and/or releases 820. A trip maintenance process 830 monitors event data 840 representing occurrences during the trip. The process reads the active trips, shipments and/or releases 820 and updates as required based upon the monitored event data. The active trips, shipments and/or release information can also, in certain embodiments, be made available to supply chain participants and/or other interested parties through any suitable access server such as via a Web site.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention as claimed.

In the claims that follow, numbers and letters may be used to provide identification of various portions of respective claims; these numbers and letters are for identification purposes only and are not intended to limit the scope of the claims in any way. The letters and numbers are provided in sequence for identification of claim portions; this sequencing is not intended to establish any requirement with respect to order or organization of the identified portions unless the text of the claim portion specifically expresses such a requirement.

What is claimed is:

1. A method for supply chain management, the method comprising the steps of:
   (a) receiving an order for one or more products from a supply chain participant via one or more access servers, wherein the access server is of a type selected from the group consisting of ftp server, e-mail server, web server, interactive voice/tone response system, fax server and combinations thereof;
   (b) accessing a system data store and retrieving data on the one or more products, wherein said system data store is physically separated from said one or more access servers;
   (c) for each of the one or more products in the received order, determining a buyer and a seller by performing steps comprising of:
      (i) retrieving an entry for each product from a system data store;
      (ii) identifying the buyer for each product from the received order or the retrieved entry for that product; and
      (iii) identifying the seller for each product from the received order or the retrieved entry for that product;
   (d) at a system processor, generating a product shipment configuration and a logistics plan based on the received order, the determined seller, the determined buyer or combinations thereof, wherein said generated product shipment configuration comprises a three-dimensional model for organizing one or more portions of the received order in a selected cargo space and wherein said system processor is physically separated from said one or more access servers and from said system data store;
   (e) determining a transporter based on the generated product shipment configuration, the generated logistics plan, the determined buyer, the determiner seller or combinations thereof;
   (f) receiving a request for the generated product shipment configuration from a buyer, from a seller or from a transporter, via one or more access servers;
   (g) transmitting the generated product shipment configuration to the determined buyer, to the determined seller, to the determined transporter or to combinations thereof, wherein the generated product shipment configuration is transmitted via a delivery platform selected from the group consisting of e-mail, web, ftp, fax, courier service, postal mail, telephone, pager and combinations thereof;
   (h) receiving a request for the generated logistics plan from a seller, from a buyer or from a transporter, via one or more access servers;
   (i) transmitting the generated logistics plan to the determined buyer, to the determined seller, to the determined transporter or to combinations thereof wherein the generated logistics plan is transmitted via a delivery platform selected from the group consisting of e-mail, web, ftp, fax, courier service, postal mail, telephone, pager and combinations thereof;
   j) receiving event data associated with the generated logistics plan from the buyer, a seller or a transporter, via one or more access servers;
   (k) generating one or more exception reports based upon the received event data and the generated logistics plans;
   (l) transmitting a notification of generation of the one or more generated exception reports by performing steps comprising of:
      (i) selecting a recipient selected from the group consisting of the determined buyer, the determined seller, the determined transporter or a supply chain management administrator;
      (ii) selecting a subset of the one or more generated exception reports for notification from the one or more generated exception reports based upon the recipient, a priority associated with each exception report or combinations thereof;
      (iii) creating a notification comprising identification information associated with each member of the subset of the one or more generated exception reports, wherein the identification information comprises a link that upon activation by the recipient allows access to the exception report associated therewith;
      (iv) selecting a delivery platform for notification from the group consisting of e-mail, web, ftp, fax, courier service, postal mail, telephone, pager and combinations thereof based upon the received request, configuration information associated with the recipient, or combinations thereof; and
      (v) transmitting the notification via the selected delivery platform.

* * * * *